UNITED STATES PATENT OFFICE.

GUSTAV EBERLE, OF STUTTGART, GERMANY.

PROCESS AND PRODUCT FOR USE IN UNLIMING HIDES AND THE LIKE.

1,006,539. Specification of Letters Patent. Patented Oct. 24, 1911.

No Drawing. Application filed September 1, 1909. Serial No. 515,670.

*To all whom it may concern:*

Be it known that I, GUSTAV EBERLE, a citizen of the German Empire, residing at Stuttgart, in the Kingdom of Wurttemberg, Empire of Germany, have invented a new and Improved Process and Product for Use in the Unliming of Hides and the Like; and I do hereby declare the following to be a full, clear, and exact description of the invention, such as will enable others skilled in the art to which it appertains to make and use the same.

My invention relates to a new process and material suitable for use in the bating process.

Efforts have been made for many years to replace the excremental materials used in the bating process by substances sufficiently uniform in composition to afford a guarantee of an identical action in use. The use of organic or inorganic acids to form soluble lime salts is not sufficient for the reason that in the treatment of certain leathers it is absolutely necessary, in order to obtain a supple and tough leather, that certain plasmatic and intercellular substances of the derma shall be dissolved. Further the calcic soaps formed by the action of the lime lye on the greasy substances of the hide or skin must be removed and the unconverted grease lying between the fibrous tissue of the derma and in the bulb dissolved. That these results are obtained by the use of an excremental macerating compound is in the applicant's opinion due to the presence of certain ferments contained therein and originating from the intestinal digestive juices, or which are formed there by the vital functions of certain microbes.

On the basis of careful analyses of excrements, the applicant has passed in review all the substances which might be of use for unliming, and he has made experiments with each of these substances alone. Among others he has worked with the organic and mineral salts contained in excrement, with cultures of intestinal bacteria, etc., cultivated in various media and, in addition with intestinal juices, pancreatic juices and bile. The contents of the gall bladder yielded the relatively most satisfactory result. The pancreatic juice (see also Wood "*Journal of the Society of Chemical Industry*," 1894), as well as macerations of intestinal mucus did not yield a sufficiently active bate. As none of these substances alone act in such a way as to yield a leather of good quality from the point of view of tenacity, fineness, polish, suppleness, etc., the applicant has tried using mixtures, and he has ascertained a fact which is quite extraordinary, that a product is thus obtained which not only combines all the valuable advantages of an excremental unliming, but also which exceeds them, without having any of those serious drawbacks, which render the work with it disagreeable, unsanitary and dangerous.

A mixture of the three active elements of intestinal digestion constitutes an ideal substitute for any excremental macerating compound and especially for dogs' dung. It is to be noted that the mixture has caustic properties, so that it does not require to be supplemented by the usual agents for unliming, such as ammonium-salts and acids. Its action is uniformly superior, regardless of the varying hardness of the water used in the process. The action of such mixtures is due to the following facts:—The pancreatic juice furnishes among others two enzyms or ferments. One—trypsin—is a peptonizing ferment, that is to say it possesses the property of decomposing albuminoid substances and forming simpler and easily soluble compounds. The second—steapsin—is a saponifying ferment which decomposes neutral grease into glycerin and fatty acids.

The ferments of the pancreas are found in the gland and its extracts in the condition of zymogens, which have no action, and which, in order to be utilized, require the presence of substances to energize or make them active. A properly energized pancreatic infusion decomposes the fatty substances; but is not a solvent for either these substances or the calcic soaps which are interposed between the fibrous tissue of the hide and adhere one to another, thus preventing the action of the enzyms in the bate and that of the tanning substance during the tanning. The bile, however, contains a peptonizing ferment and dissolves grease and calcic soaps with the greatest facility, and has also the faculty of energizing the pancreatic juice by easily converting its zymogens into enzyms. It is in particular the combination of the saponifying ferment with the bile that increases its effect to a point which cannot be attained by any other combination. The utility of bile for unliming is further brought out by the following facts:—It forms easily soluble calcic salts and thus unites with a part of the lime contained in the hides; and its presence in the bates prevents any formation of $CaCO_3$ even when the water is very calcareous.

The extracts of intestinal mucus contain alkaline substances and ferments, among others a proteolytic ferment—erepsin—which entirely decomposes albumoses and peptones, thus completing the tryptic action, and also a saponifying ferment. By adding to the pancreatic juice an extract of intestinal mucus, the trypsinogen is converted into trypsin and so acquires the property of vigorously acting on albuminoid substances (Abderhalden, *Lehrbuch der Physiologischen Chemie*, 556).

The maximum value of the mixture is obtained when it is used at a temperature of from 35° to 40° C. The most favorable proportions are generally the same as those which obtain in the animal system but they must be varied according to the effect which it is desired to obtain. By reducing or increasing one or two of the three products a bate may be formed which is of special efficacy and which must be prepared according to the qualities and nature of the hide to be unlimed and its previous and subsequent treatment. For instance, by changing the proportions of the pancreatic maceration and the intestinal infusion, the tryptic action may be increased or diminished. The quantity of bile is determined according to the amount of fatty and calcic substances and the like contained in the hides.

In certain branches of the industry, where the suppleness and thinness of the leather is not of particular importance, the removal of any of the plasmatic substance of the skin in the bathing or unliming of the hides is regarded as a loss, and as my process may be carried out so as only to produce a relaxing of the tissues without loss of skin substance, it is equally applicable to this particular treatment.

As an example of the manner of preparation of my compound, is given the following:—The pancreatic glands are chopped and rubbed with about double the quantity of carefully cleaned silver-sand. This mixture is then pressed in a hydraulic press until no more juice can be forced out. The residue can be further lixiviated to obtain an inferior grade of pancreatic juice. The contents of the gall bladder are steamed or boiled to obtain a concentrated solution, and this concentrated bile solution is added to the pancreatic juice. The bile solution, in spite of its antiseptic properties, has a powerful energizing effect on the pancreas juice. The intestinal glands, which, after the intestines are cleaned, usually form a worthless refuse, are then extracted in a vacuum apparatus with double their weight of a 30% glycerin solution, and this extract is added to the pancreas juices and the bile solution, one part of each by weight being taken.

The practical tanner will have no difficulty in ascertaining by a few trials, how large a quantity of the mixture must be added to produce the desired result. For example, in treating lamb skins, one kilogram of the mixture may be added to 150 skins, and by observation after about an hour, the necessity of desirability of further additions can be readily determined.

I claim:—

1. A composition of matter for use in the manufacture of leather comprising a mixture of extracts containing proteolytic and saponifying zymogens, with substances capable of energizing the zymogens and of dissolving calcic soaps, fatty substances and lime.

2. A composition of matter for use in the manufacture of leather comprising a mixture of bile, an extract of the intestinal mucus, and an extract of the pancreatic gland.

3. A composition of matter for use in the manufacture of leather comprising a mixture of an extract containing trypsin and steapsin, an extract containing erepsin and a saponifying ferment, and a substance capable of converting zymogens into enzyms, which contains a peptonizing ferment and is a solvent for grease and calcic soaps.

4. A process for bathing or unliming hides, which consists in subjecting the same to a bath containing a mixture of extracts containing proteolytic and saponifying zymogens, with substances capable of energizing the zymogens and of dissolving calcic soaps, fatty substances and lime.

5. A process for bathing or unliming hides, which consists in subjecting the same to a bath containing a mixture of bile, an extract of the intestinal mucus, and an extract of the pancreatic gland.

6. A process for bathing or unliming hides, which consists in subjecting the same to a bath containing a mixture of an extract containing trypsin and steapsin, an extract containing erepsin and a saponifying ferment, and a substance capable of converting zymogens into enzyms, which contains a peptonizing ferment and is a solvent for greases and calcic soaps.

In testimony whereof I affix my signature, in presence of two witnesses.

GUSTAV EBERLE.

Witnesses:
 JEAN GULDEN,
 HERMANN HOPPE.

Correction in Letters Patent No. 1,006,539.

It is hereby certified that in Letters Patent No. 1,006,539, granted October 24 1911, upon the application of Gustav Eberle, of Stuttgart, Germany, for an improvement in "Processes and Products for Use in Unliming Hides and the Like," an error appears in the printed specification requiring correction as follows: Page 2, lines 41, 98, 105, and 110, for the word "bathing" read *bating;* and that the said Letters Patent should be read with this correction therein that the same may conform to the record of the case in the Patent Office.

Signed and sealed this 7th day of November, A. D., 1911.

[SEAL.]
               E. B. MOORE,
                *Commissioner of Patents.*